June 4, 1968 W. DEIGHTON 3,386,742

MECHANICAL MOVEMENT

Filed March 3, 1965 8 Sheets-Sheet 1

INVENTOR.
WARD DEIGHTON
BY
Attorney

June 4, 1968 W. DEIGHTON 3,386,742

MECHANICAL MOVEMENT

Filed March 3, 1965 8 Sheets-Sheet 2

INVENTOR.
WARD DEIGHTON
BY
[signature]
Attorney

INVENTOR.
WARD DEIGHTON
BY [signature]
Attorney

June 4, 1968 W. DEIGHTON 3,386,742

MECHANICAL MOVEMENT

Filed March 3, 1965 8 Sheets-Sheet 4

INVENTOR.
WARD DEIGHTON
BY Samuel Cohen
Attorney

MECHANICAL MOVEMENT

Filed March 3, 1965 8 Sheets-Sheet 5

INVENTOR.
WARD DEIGHTON
BY Samuel Cohen
Attorney

June 4, 1968 W. DEIGHTON 3,386,742

MECHANICAL MOVEMENT

Filed March 3, 1965 8 Sheets-Sheet 6

INVENTOR.
WARD DEIGHTON

BY Samuel Cohen

Attorney

June 4, 1968 W. DEIGHTON 3,386,742

MECHANICAL MOVEMENT

Filed March 3, 1965 8 Sheets-Sheet 7

Inventor:
WARD DEIGHTON

Attorney

MECHANICAL MOVEMENT

Filed March 3, 1965

INVENTOR.
WARD DEIGHTON
BY [signature]
Attorney

United States Patent Office 3,386,742 Patented June 4, 1968

3,386,742
MECHANICAL MOVEMENT
Ward Deighton, Glen Mills, Pa., assignor to Radio Corporation of America, a corporation of Delaware
Filed Mar. 3, 1965, Ser. No. 436,868
16 Claims. (Cl. 274—4)

ABSTRACT OF THE DISCLOSURE

An arrangement for moving a load, such as the magnetic head of a cartridge loaded type tape station, to one of a number of different positions. One of its features is the automatic centering of the head in its tape engaging position by means of a keyed, three point support onto which the head mounting plate is driven. Another feature of one embodiment of the arrangement described is the automatic withdrawal of the head to its retracted position in the event of power failure or other system malfunction.

An object of the invention is to provide an arrangement for accurately, reliably and reproducibly moving an element from one position to another.

A more specific object of the invention is to provide, for a tape station of the cartridge-loaded type, an arrangement for moving a magnetic head from its retracted position to a position in the cartridge in operative relation with the magnetic tape.

Another object of the invention is to provide an arrangement for accurately registering a magnetic head with a magnetic tape, which arrangement is capable of readily reproducing such registration during successive positioning cycles of the head.

Another object of the invention is to provide an arrangement for automatically withdrawing a magnetic head to a retracted and protected position in the event of malfunction of the magnetic head driving means.

The system of the invention includes a surface formed with a plurality of supports. An element, such as a mounting plate for a magnetic head, is movable to a position such that it mates with at least two of the supports and rests on a third of the supports. The means for moving the element is resiliently coupled thereto and, when it moves the element onto its supports, permits sufficient movement of the element to allow the element accurately to mate with and seat itself on the supports. The means for moving the element also resiliently holds the element against the supports. As applied to a magnetic head, when the element is in position on its supports, the head is magnetically coupled to the magnetic tape.

In a preferred form of the invention, in the event of system malfunction, the element, such as a magnetic head, is automatically withdrawn to a retracted and protected position. The withdrawing means includes a biasing element which is coupled between a rotatable yoke, in which the element is slidably mounted, and the element. It includes also a second biasing element coupled between the yoke and chassis. Upon system malfunction, the second biasing element rotates the yoke to its home position and the first biasing element withdraws the element to its retracted position in the yoke.

The invention is illustrated in the following drawings, of which:

FIGURES 1, 2 and 3 are cross-sections through a magnetic head moving mechanism according to one embodiment of the invention. FIGURE 1 shows the head in its fully retracted position; FIGURE 2 shows the head after having moved through a portion of operating cycle; and FIGURE 3 shows the head in its fully extended position in operative relationship with a magnetic tape;

Through the figures, similar reference numerals are employed to identify similar parts.

Figure 1:
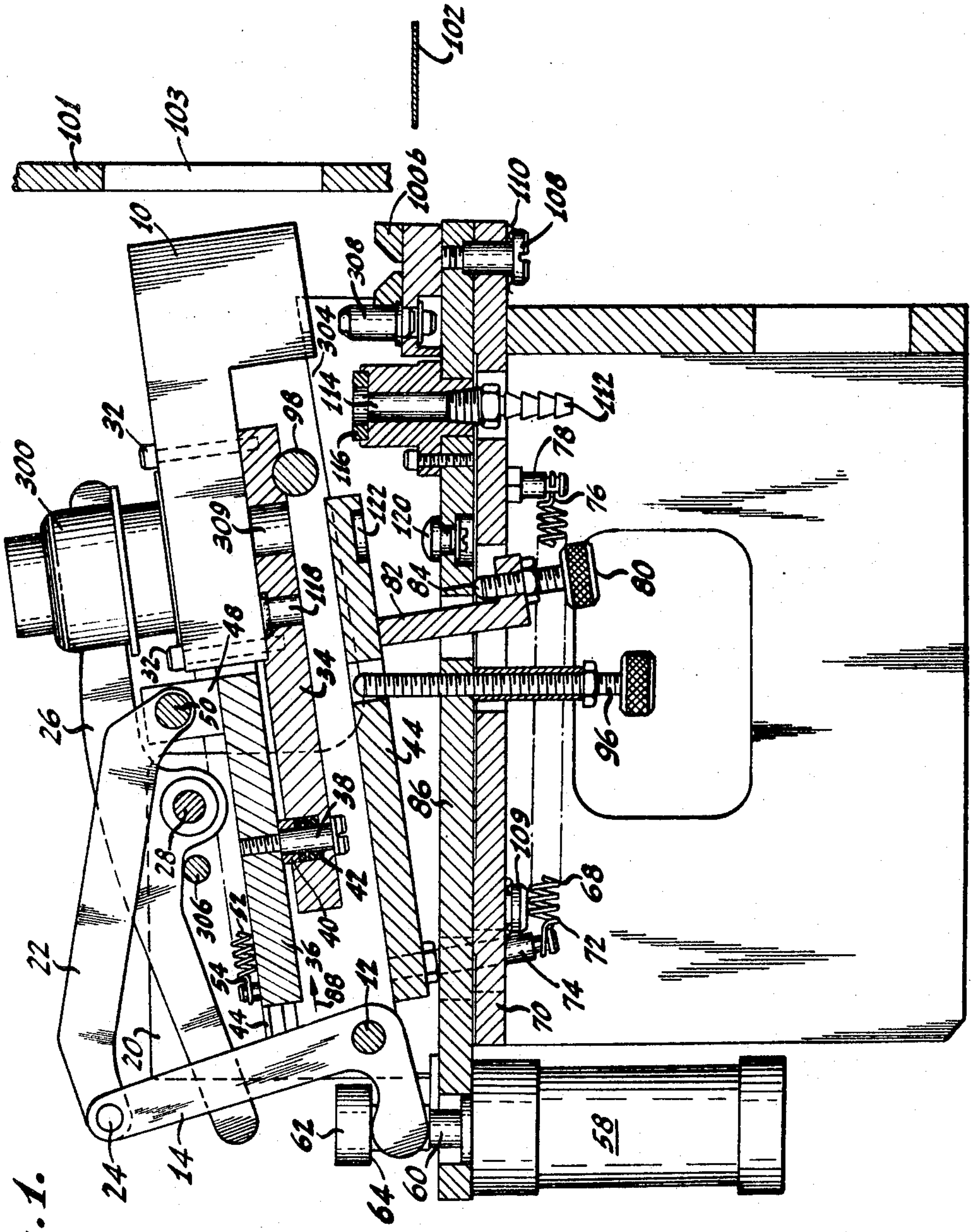
Figure 2:
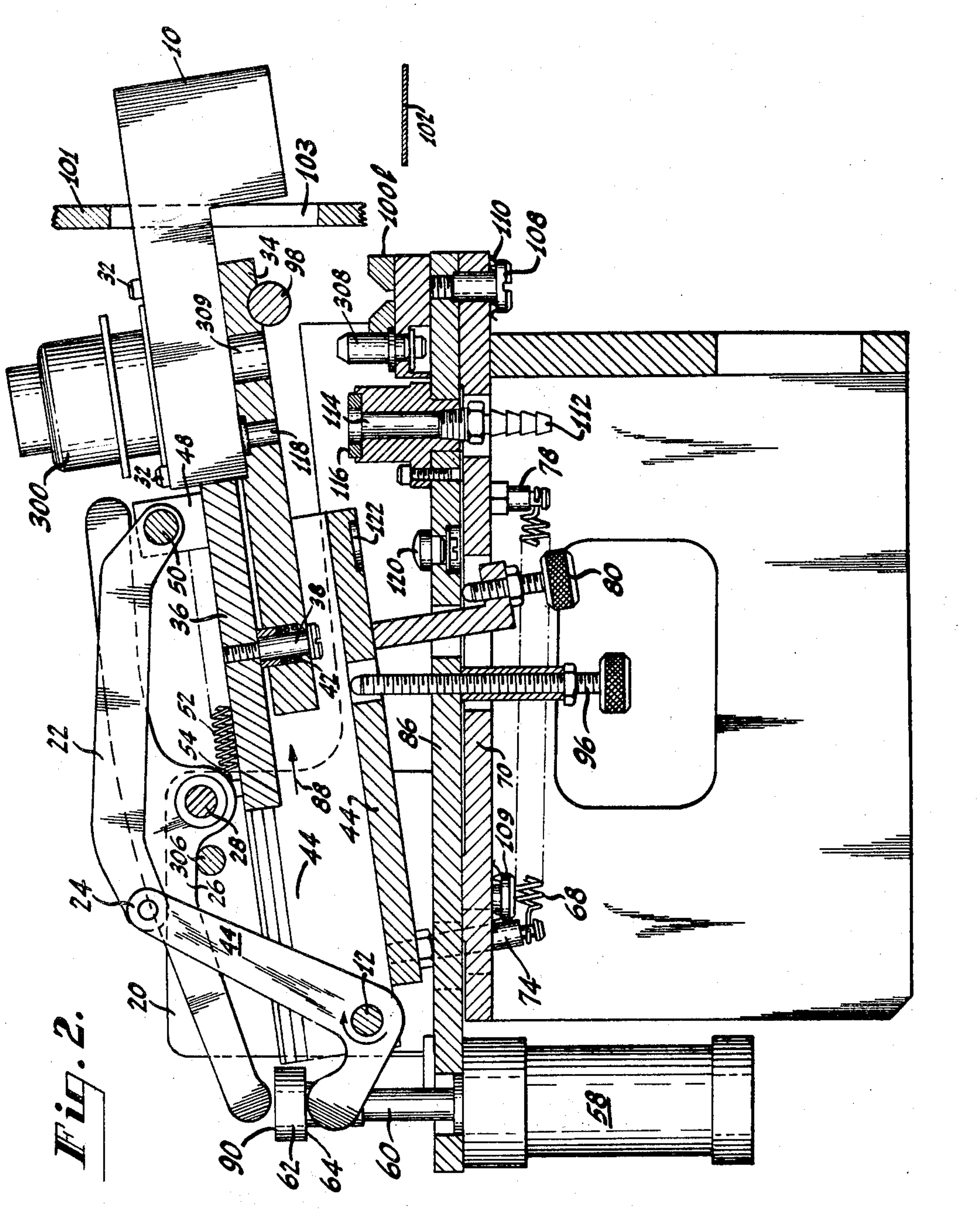
Figure 3:
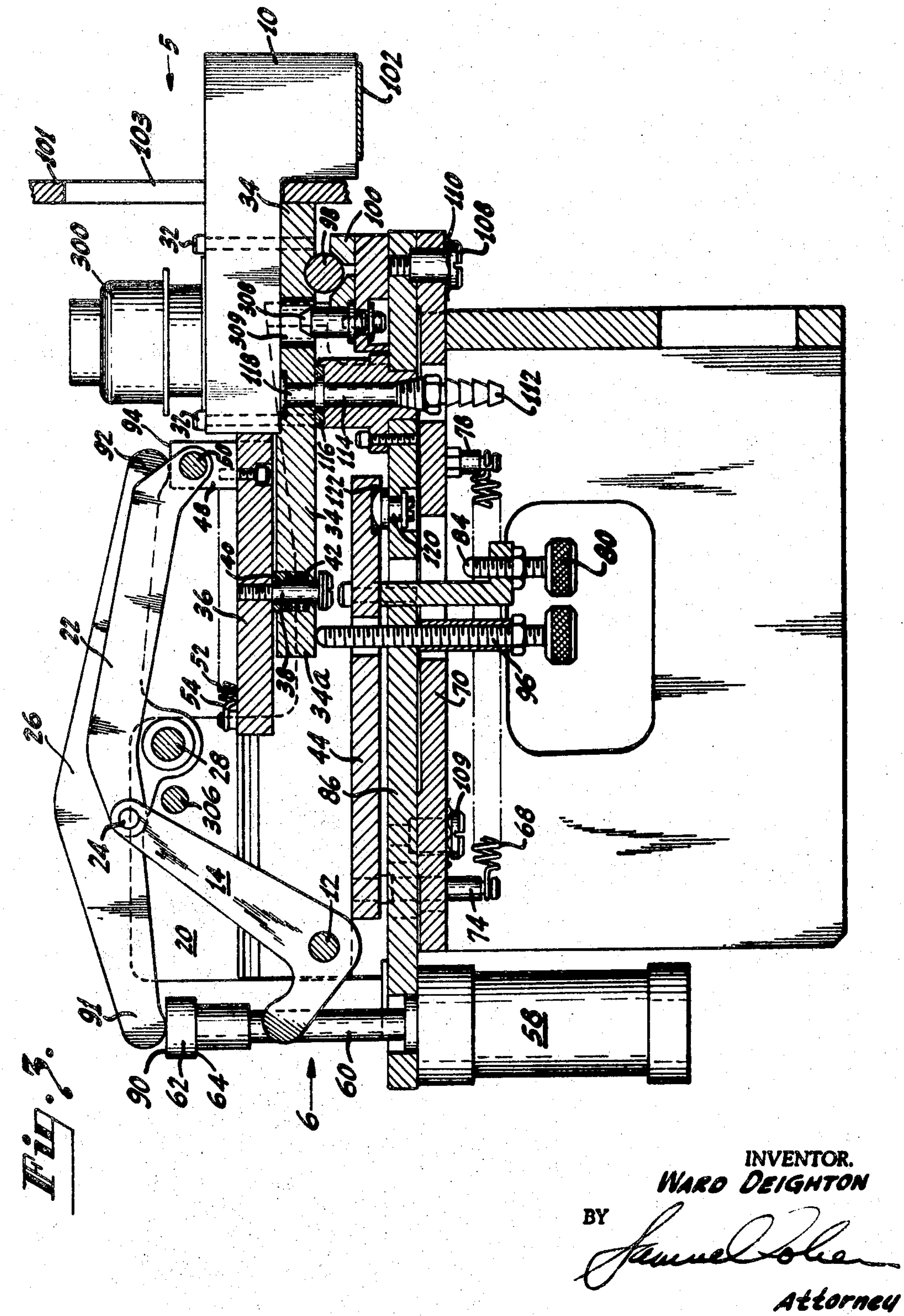
Figure 5:
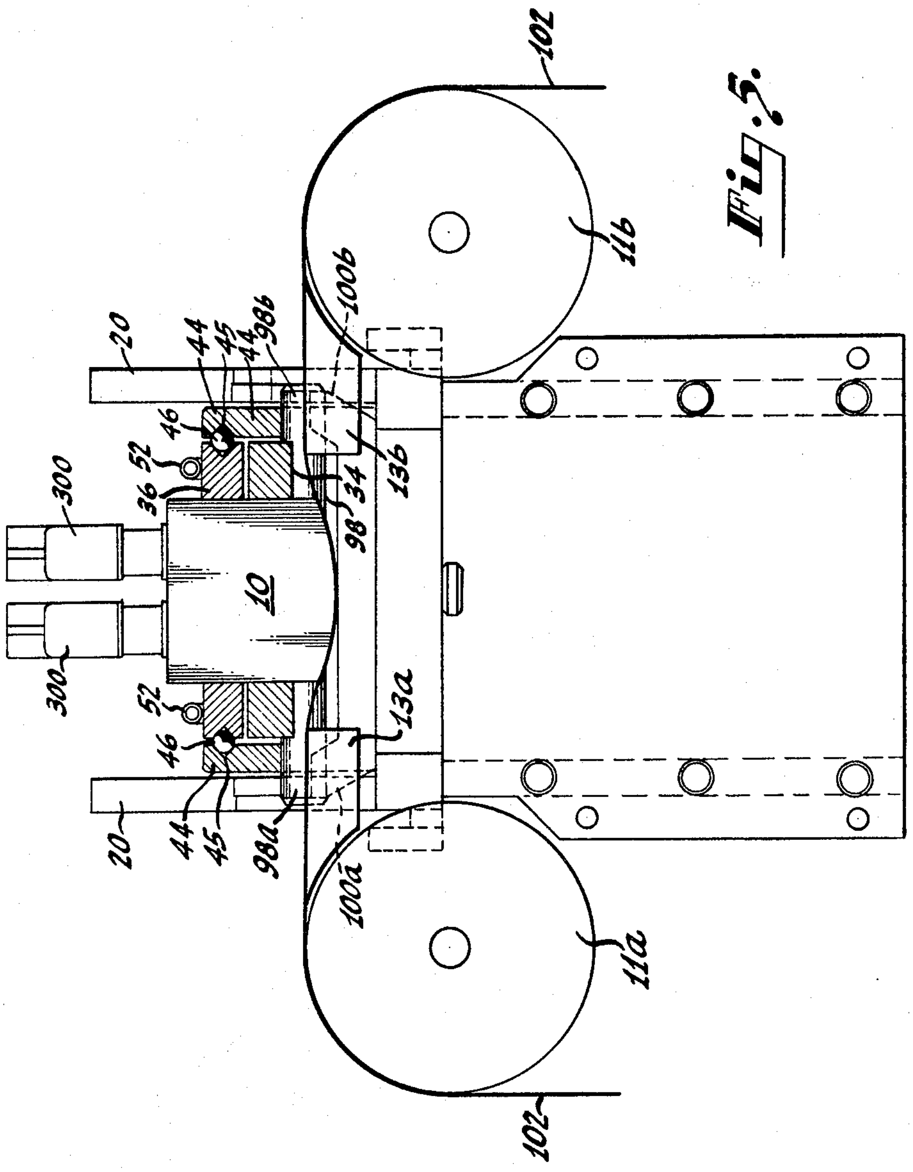
FIGURE 5 is an end view of the mechanism of FIGURES 1–4 in the direction of arrow 5 of FIGURE 3.
Figure 6:
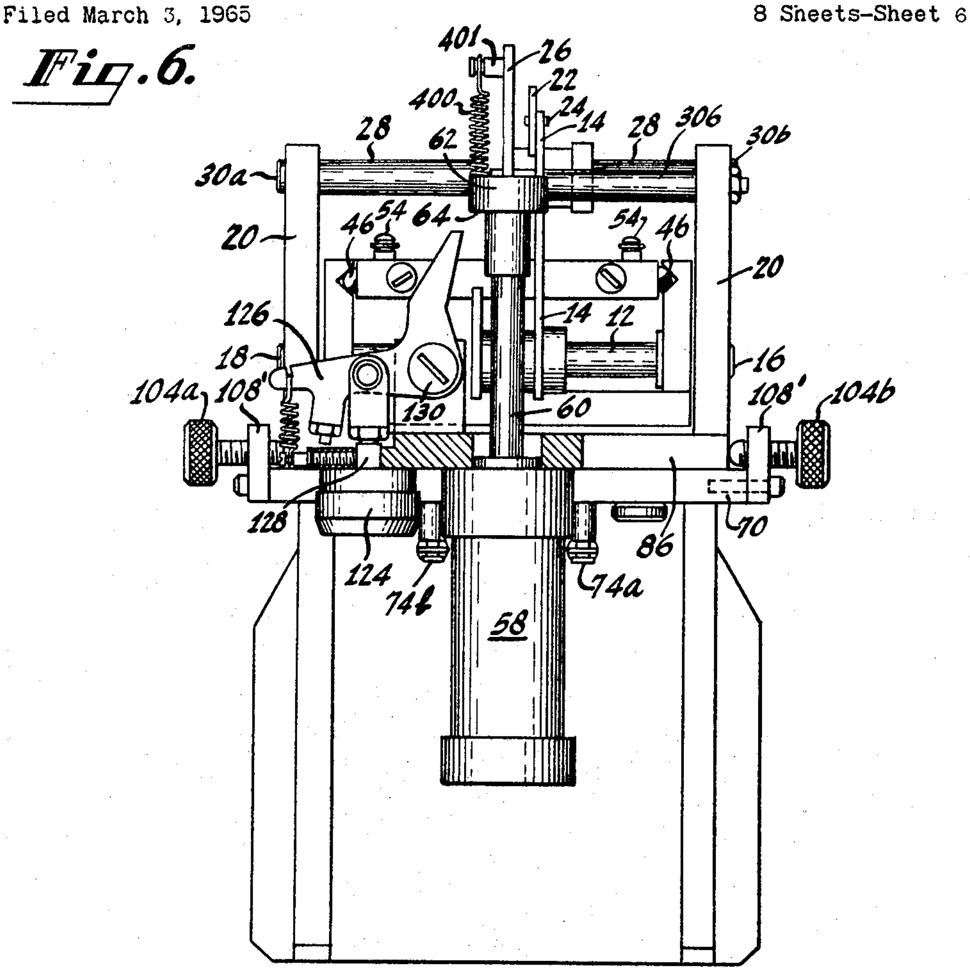
FIGURE 6 is an end view of the mechanism of the invention taken in the direction of arrow 6 of FIGURE 3.
Figure 7:
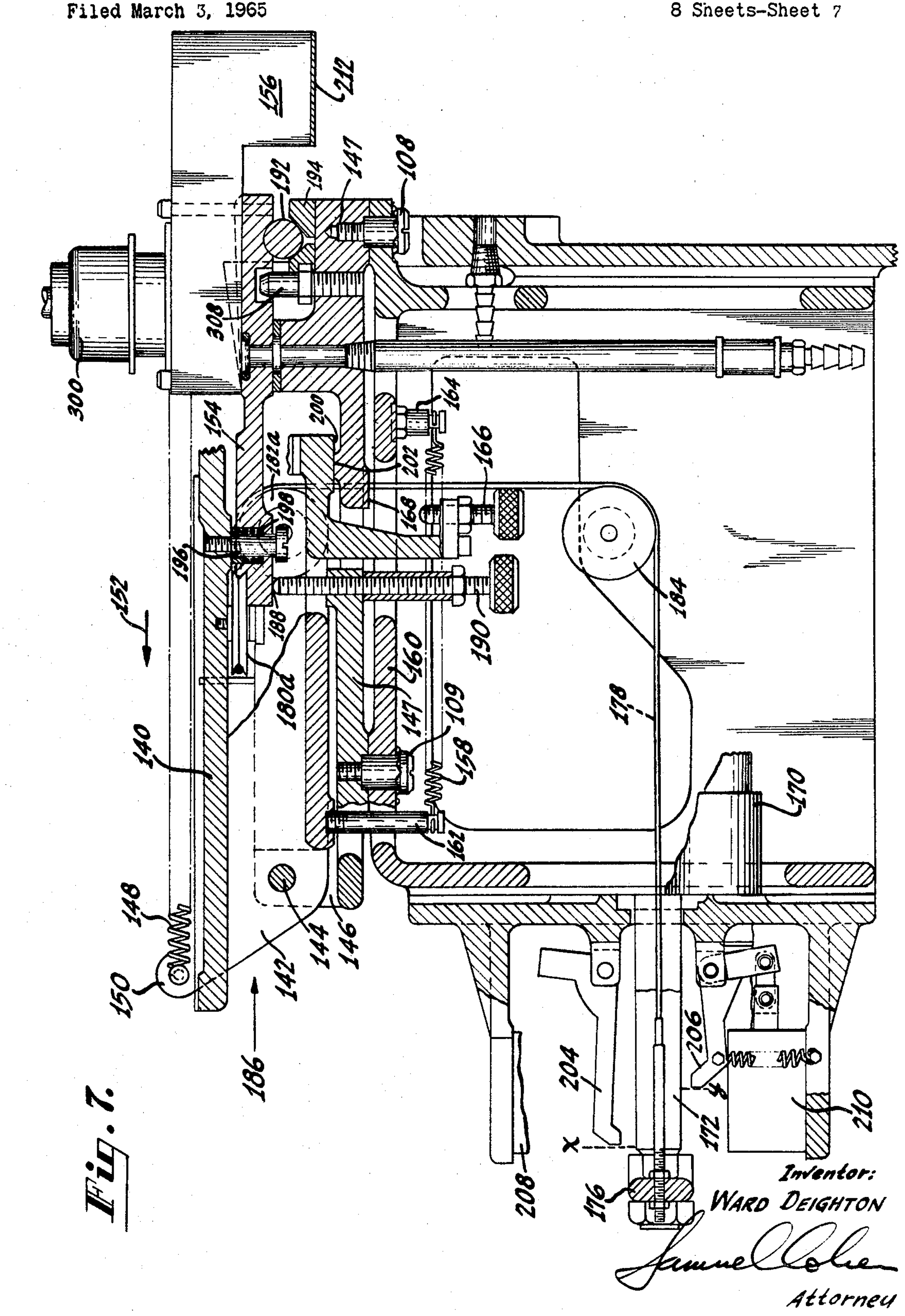
FIGURE 7 is a cross-section through a second embodiment of a head moving mechanism according to the invention.
Figure 8:
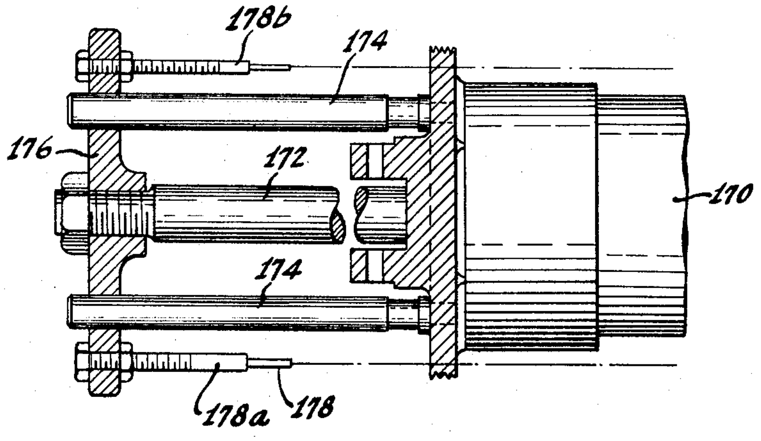
FIGURE 8 is a top view showing in greater detail the air piston assembly of FIGURE 7.
Figure 9:
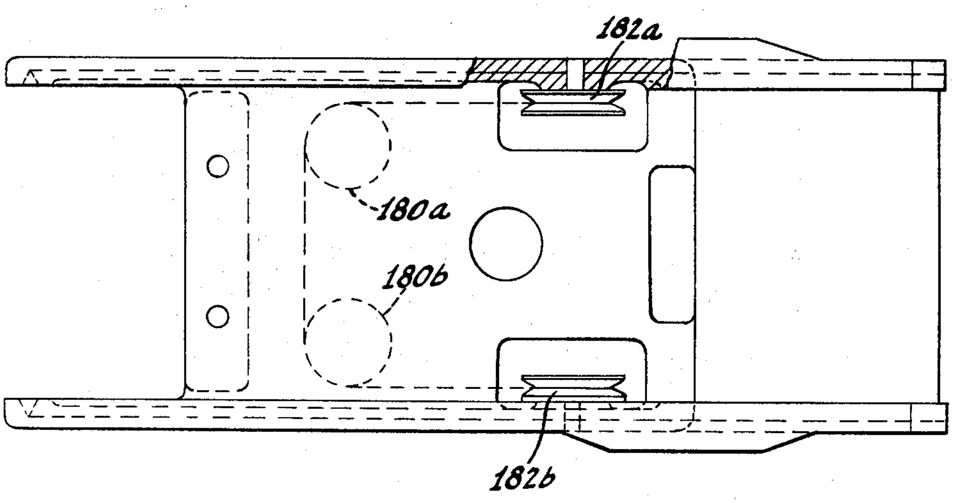
FIGURE 9 is a top view of a portion of the arrangement of FIGURE 7.

The mechanical arrangement of the invention is one for moving a magnetic head 10 from a retracted position such as shown in FIGURE 1 to a fully extended position such as shown in FIGURE 3. In the discussion which follows, the embodiment of FIGURES 1–6 is discussed first. This embodiment includes an arrangement of springs and mechanical links. The second embodiment, illustrated in FIGURES 7–9, is controlled by springs and by a cable which passes over pulleys. However, the head centering mechanism of both embodiments is substantially identical.

Figure 4:
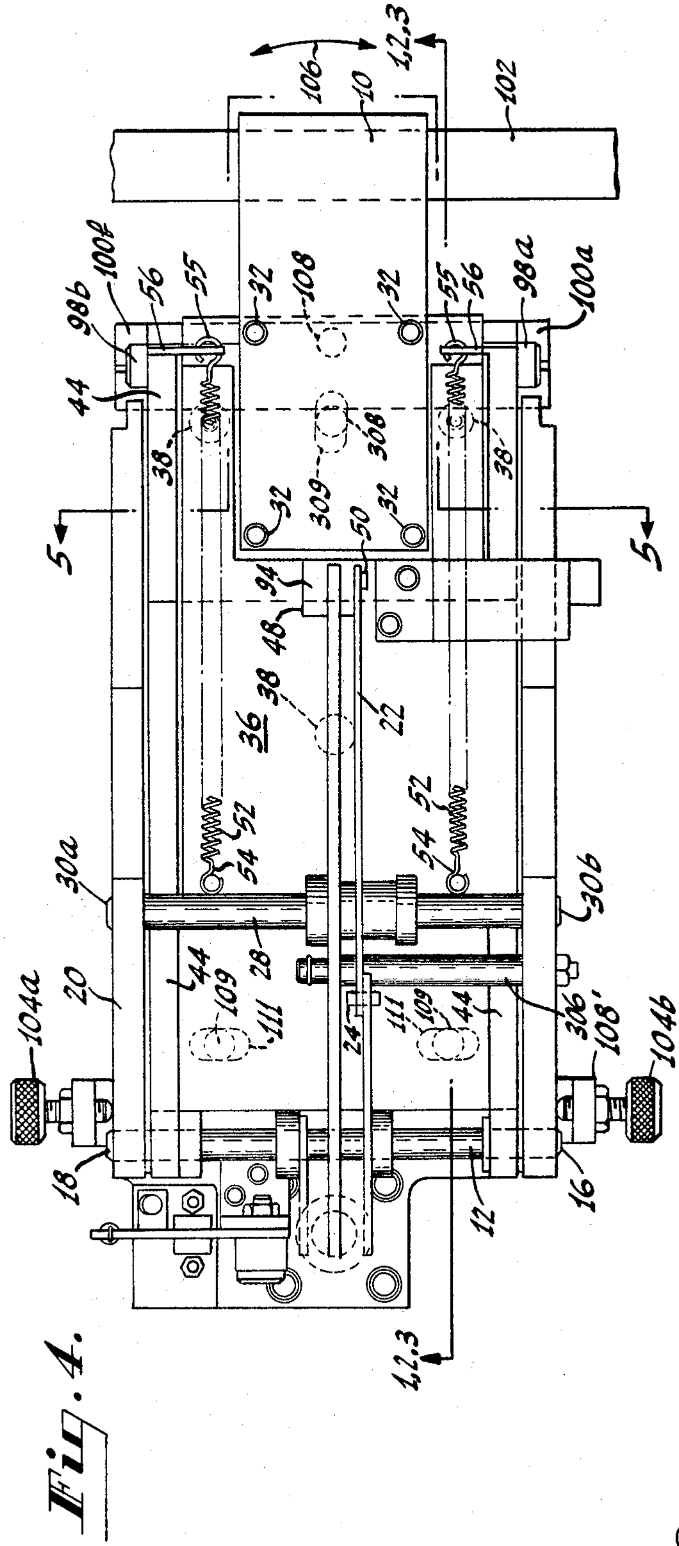
FIGURE 4 is a top view of the mechanism of FIGURES 1–3.

The head moving mechanism of the various figures is part of a "tape station" of the cartridge-loaded type. A cartridge includes a housing and two magnetic tape reels within the housing. One reel is a take-up reel and the other, a storage reel. When the cartridge is placed in operative position, the reels and tape are automatically engaged by suitable reel and tape driving means (the tape drive capstans 11*a*, 11*b* are shown in FIGURE 5). And a portion of the magnetic tape which extends between the two reels is positioned so that it can be engaged by the magnetic head, when the head is in extended position (FIGURES 3 and 7). The rear wall 101 of the cartridge is shown, in part, in FIGURES 1–3. It is formed with an opening 103 through which the magnetic head 10 can pass (FIGURE 3). The magnetic tape is shown, in part, at 102 (FIGURES 1–4).

The axle 12, about which movement of the yoke 44 and many other elements occurs, is secured at its opposite ends 16 and 18 to the vertical plates 20. The mounting of the axle 12 is shown most clearly in FIGURE 4, at the left. One of the plates 20 is visible in FIGURES 1–3. The axle 12 passes through a link 14 and the latter is connected to a second link 22 by means of a short axle 24. A third link 26 rests on supporting rod 306 and is rotatably mounted on still another axle 28. Link 26 is maintained in the position shown in FIGURE 1 by a spring 400 (FIGURE 6) which is secured at one end to the rod 306 and at its opposite end to anchor 401 on the link 26. Axle 28 is secured at its ends 30*a* and 30*b* also to the vertical plates 20, as shown in FIGURE 4.

The head 10 is secured by means of bolts 32 to head mounting plate 34. The latter resiliently is coupled to a slide plate 36 by means of three bolts 38. The relative positions of the three bolts 38 is shown in FIGURE 4 by means of dashed circles. A more detailed showing of one of the bolts appears in FIGURES 1–3. Each such bolt 38 is surrounded by a sleeve 40 and a spring 42. The springs 42 urge the head mounting plate 34 away from the slide plate 36. As the bolts 38 relatively loosely pass through the head mounting plate 34, a certain amount of seating movement of plate 34 with respect to the slide plate 36 is possible.

The slide plate 36 is mounted in a yoke 44 and is slidable in this yoke. The relative positions of the head mounting plate 34, the slide plate 36, and the yoke 44 are shown in FIGURE 5. FIGURE 5 also shows the tracks or races 45 for the ball bearings 46 along which the slide plate 36 rolls.

The link 22 is secured to a bracket 48 on the slide plate 36 by means of an axle 50. The springs 52 above the slide plate 36 are secured at one end 54 to a post on the slide plate and at their other end 55 to brackets 56 on the yoke 44. The ends 55 of the springs and brackets 56 to which these ends are secured are shown in FIGURE 4. This figure also shows that there are two such springs.

The air cylinder which actuates the mechanism of FIGURES 1–6 is shown at 58. A piston rod 60 extends into this cylinder and a piston head 62 is located at the end of the piston rod. In the fully retracted position of the magnetic head 10, as shown in FIGURE 1, the link 14 bears against the bottom surface 64 of the piston head 62.

Two similar springs, one of which is shown at 68, are located beneath the supporting platform 70. The two springs are secured at one end 72 to posts (one of which is shown at 74 in FIGURE 2) which are fixed to the yoke and extend through apertures in the horizontal plate 70 of the chassis. (Both of the posts 74 and 74*a* are shown in FIGURE 6.) The springs are secured at their opposite ends 76 to posts (one of which is shown at 78) fastened to the plate 70.

Plate 86 is secured to vertical plates 20 and together these plates support the yoke 44, head mounting and slide plates 34 and 36, respectively, and so on. However, the plate 86 and plates 20 together are movable a slight amount, in the plane of the plate 86, with respect to the plate 70. The pivot about which this movement occurs is bolt 108, as is discussed later.

In the operation of the arrangement of FIGURES 1–6, the piston is initially in the position shown in FIGURE 1. The spring 68 draws the post 74 toward the post 78. This causes the yoke and all of the elements located on the yoke to rotate counter-clockwise about the axle 12. The limiting position is determined by the stop bolt 80. This bolt is threaded through a supporting bracket 82 on the yoke 44 and the point 84 of the stop bolt 80 bears against the lower surface of the horizontal plate 86.

The springs 52 are under tension and tend to move the slide plate 36 in the direction of arrow 88 with respect to the yoke 44. As viewed in FIGURE 1, this is movement to the right; however, such movement is prevented by the piston head 62, as this piston head holds the link 14 in the position shown and the links 14 and 22, in turn, hold the slide plate 36 in place.

Upon actuation of the air cylinder, the piston 60 moves upward as shown in FIGURE 2. This permits the link 14 to rotate clockwise about axle 12. The spring 52 draws the slide plate 36 in the direction of arrow 88 and the slide plate, which is secured to link 22 at axle 50, causes the link 22 to move with it, keeping link 14 in contact with surface 64. The head mounting plate 34 is coupled to the slide plate 36 by means of the bolts 38 so that when the slide plate moves, the head mounting plate and magnetic head 10 also move. As can be seen in FIGURE 2, the result of the initial actuation of the air cylinder is to cause the head to move outward toward its extended position. The outward movement continues until a portion of the slide plate 36 engages a limit pin (not shown) which is fixed to the yoke.

FIGURE 3 shows the arrangement later in its cycle. The piston rod 60 and head 62 move further upward. The top surface 90 of the piston head 62 now engages one end 91 of the link 26 and causes the link 26 to rotate clockwise about its axle 28. The opposite end 92 of the link now engages the top surface 94 of the bracket 48 and drives the bracket and the slide plate 36, to which the bracket is mounted, toward its final position.

While moving toward its final position, the pin 96 (lower center of FIGURE 3) which is threaded into the horizontal plate 86 engages the bottom surface of the head mounting plate 34 at one point. A bar 98 is secured to the head mounting plate. This bar now seats in the V blocks 100*a* and 100*b* at the two ends 98*a* and 98*b* of the bar. The two ends of the bar and the V blocks are shown in FIGURES 4 and 5. The three bolts 38 permit slight amounts of seating movement (in the plane of the plates, in a direction perpendicular thereto and in other directions) between the magnetic head mounting plate 34 and the slide plate 36. This movement permits the head mounting plate to adjust itself so that the ends 98*a* and 98*b* of the bar 98 sit securely in the V blocks and the portion 34*a* of the plate 34 sits securely on the end of the pin 96. The three-point support thereby obtained with the mounting plate 34 slightly lifted from the heads of the three bolts 38 and with the three coil springs 42 under a slight amount of compression insures a relatively constant and reproducible force pressing down on the V block. Moreover, the three-point support and spring action of the springs 42 effectively isolate the head from the slide plate, and the springs, links, and so on, coupled to the slide plate. The arrangement has been found very accurately to position the head at precisely the same location during successive cycles of operation.

After the bar 98 of the magnetic head mounting plate 34 strikes V blocks 100, the yoke 44 continues to move through a relatively small angle until the portion of the yoke formed with depression 122 (center of FIGURE 3) mates with and abuts the rounded surface of the stop bolt 120. This bolt 120 serves also properly to position the yoke when it moves to the position shown in FIG. 3.

Positioning in the direction of the axis of bar 98 is aided by the pin 308 which mates with the slot 309 in the head mounting plate 34. The slot and pin are also shown in phantom view in FIGURE 4. The proper positioning is achieved by the relatively close fit between the pin 308 and its slot 309 in the dimension in and out of the paper in FIGURES 1–3. It might be mentioned, however, that the position of the head in this direction is not critical and the slight clearance between the pin 308 and its slot 309 can be tolerated.

The cam surface 304 of FIGURES 1–3 is for the purpose of limiting the path of motion of the bar 98. This surface 304 prevents the bar 98 and the magnetic head to which the bar is secured from being lowered, except when the magnetic head reaches its fully extended position. If the cam surface were absent, the head could be lowered, either manually or in the event of spring breakage, anywhere along the path it follows and could be damaged by striking other parts of the mechanism.

A short section of the tape is shown at 102 in FIGURES 1–3. This same tape is shown in top view in FIGURE 4. The adjustment bolts 104*a* and 104*b* shown in FIGURES 4 and 6 are for adjusting the position of the head with respect to the tape in the direction of arrows 106 (FIGURE 4). The adjustment bolts 104*a* and 104*b* are threaded through brackets 108′ which are fixed to the lower plate 70 of FIGURES 1–3. The ends of the bolts 104 bear against the horizontal plate 86 which, it will be recalled, is, in turn, secured to the vertical plates 20 (see FIGURE 6). The plate 70 is coupled to the plate 86 by means of three bolts. The first is a pivot bolt 108 which passes through an aperture in plate 70 and is threaded into the plate 86. The second and third bolts 109 are also threaded into plate 86 and fit through slots 111 in plate 70. The relative positions of bolts 108 and 109 and slots 111 are shown by dashed lines in FIGURE 4. The spring washers 110 beneath the heads of bolts 108 and 109 (FIGURES 1–3) resiliently hold the plate 86 in position against plate 70. When the bolts 104*a*, 104*b* of FIGURES 4 and 6 are adjusted, plate 86 slides over plate 70 about pivot bolt 108 causing the movement of the head mentioned above.

The fitting 112 of FIGURES 1–3 is for connection to a vacuum pump (not shown). This fitting leads to a tube 114. A washer or gasket 116, which may be made of rubber or the like, is located at the end of the tube. In the position shown in FIGURE 3, the head mounting plate 34 abuts the resilient washer 116 and thereby forms an airtight connection between the tube 114 and a corresponding tube 118 in the plate 34. As the washer 116 is relatively resilient, it does not interfere with the head centering mechanism discussed in the preceding paragraphs.

The aligned tubes 114, 118 lead to openings (not shown) in the magnetic head assembly. The vacuum pump draws air through these openings and the magnetic tape is thereby drawn toward the head, in well known fashion. Any foreign particles which may be present on the tape surface are drawn through these openings.

The parts 300 (FIGURES 1–3 and 5) are electrical connectors used to connect flexible wire cables to the head. One connector is for the write wires and the other is for the read wires.

FIGURE 5 shows more detail of the magnetic tape itself than the other figures. The tape is driven by drive capstans **11*a* and 11*b* and passes over tape guide blocks 13*a* and 13*b*. The tape abuts the head 10** as the tape is driven past the transducers of the head.

Solenoid 124, shown in FIGURE 6, when energized, moves the link 126 into position to engage the bottom surface 64 of the piston head 62. When the solenoid is actuated, the shaft 128 moves upward and the link 126 rotates clockwise about its axle 130. Thereafter, if the air cylinder 58 is actuated to withdraw the piston head 62, the link 126 engages the piston head. This causes the magnetic head 10 to stop in a position slightly above the magnetic tape 102 but not in contact with the magnetic tape. In this position, the magnetic tape may be quickly rewound and, since the magnetic head is not in contact with the tape, there is no abrasion or unnecessary wear of the tape or head. However, the magnetic head is still sufficiently close to the tape that the "end-of-tape" signal can be read. In practice, solar cells (not shown), located in the head, sense light from a source (not shown) beneath the tape. This light passes through an end-of-tape "window" (a transparent area) located at the end portion of the tape.

While having the many advantageous features discussed above, the arrangement of FIGURES 1–6 does have one disadvantage. When the head is in its retracted position, shown in FIGURE 1, and, due to loss of power, the air cylinder mechanism 58 becomes inactive, the springs 52 cause the slide plate and head to move to their fully extended position. In this fully extendind position, the head is subject to accidental damage. For example, if, after a power failure, it was attempted to remove the cartridge, the wall of the cartridge could easily strike and damage the head.

The improved arrangement of FIGURE 7 overcomes the disadvantage above. The linkage mechanism above the slide plate and yoke is eliminated completely, as is explained in detail below. The spring mechanism is such that if a loss of power should occur during any portion of the cycle of operation, the head is automatically withdrawn rather than moved to the fully extended position. The centering mechanism is substantially identical to the one of FIGURES 1–6 and therefore is not discussed in detail below.

FIGURE 7 shows the head in its fully extended position. The slide plate 140 is slidably mounted in the yoke 142 in essentially the same way as these two elements are arranged in the first embodiment of the invention. The axle about which the yoke and slide plate pivot appears at 144. As in the previous embodiment, this axle is secured at its opposite ends to the chassis side plates 146.

Two springs, one of which is shown at 148, are located above the slide plate and fixed at one end to arbors, one of which is shown at 150, on the yoke 142. The springs are secured at their opposite ends (not shown) to the slide plate 140. The springs 148 are under tension and therefore tend to draw the slide plate in the direction of arrow 152 (to the left in FIGURE 7).

The head mounting plate 154 is resiliently coupled to the slide plate 140 by three bolts 196 (only one of which is shown in FIGURE 7) in the same manner as in the previously discussed embodiment of the invention. Similarly, the magnetic head 156 is bolted to the head mounting plate 154 also as in the previous embodiment.

Two springs, one of which is shown at 158, are located beneath the platform 160 of the chassis. The springs are fixed at one end to pins, one of which is shown at 162, on the yoke 142 and are fixed at their opposite ends to pins, one of which appears at 164, on the platform 160. Springs 158 are under tension and tend to move the yoke in a counterclockwise direction about axle 144. In other words, the springs 158 tend to move the magnetic head 156 upward. The maximum angle through which this movement may occur is determined by the adjustment of the stop bolt 166. The end of this bolt engages the surface 168 when the head is tilted to its maximum upward position.

The driving means for the arrangement of FIGURE 7 includes an air cylinder 170 (FIGURE 8) and piston rod 172. Elements 174 (FIGURE 8) are alignment pins for the piston, their purpose being to prevent the piston from rotating. A cross arm 176 is secured to the end of the piston and a cable 178 is secured at its ends **178*a* and 178*b*** to the cross arm.

The cable 178 passes over six pulleys. Two of the pulleys **180*a* and 180*b* are fixed to the slide plate 140. Two of the pulleys 182*a* and 182*b* are secured to the yoke. And two of the pulleys, only one of which 184 is visible, are secured to the chassis. The four pulleys mentioned first are shown in their correct relative positions in FIGURE 9. Pulleys 180*a*, 182*a* and 184** are also shown in FIGURE 7.

In the explanation of the operation of the embodiment of FIGURES 7–9 which follows, the magnetic head 156 may be assumed initially to be in its tilted-up position (not shown in FIGURE 7). At this time, the piston 172 is in its fully retracted position (not shown in FIGURE 7). When the air cylinder is energized and the piston made to move out toward its fully extended position, the take-up of the cable 178 first causes the slide plate 140 to move in the direction of arrow 186 against the tension of springs 148. It should be mentioned here that the springs 158 are sufficiently heavier than the springs 148, that the springs 148 become fully extended before the springs 158 are actuated.

When the slide plate moves to its limit position, a projection (not shown) on the slide plate engages a stop (not shown) on the yoke. At this time the head 156 is fully extended.

As the cable is taken up further, the head starts to rotate downward. In other words, the yoke 142, the slide plate 140, and the head mounting plate 154 all rotate together about the axle 144. In the process, the spring 158 becomes extended. (In FIGURE 7, the spring 158 is in its most extended condition.) This movement continues until the under-surface of the head mounting plate strikes the end 188 of pin 190. Thereafter, the ends of the bar 192 engage the two notches in blocks 194. (These are analogous to and in the same relative positions as the blocks **100*a* and 100*b* of FIGURES 1–4.) Three-point centering and support occurs, as previously described, the resilient coupling of the slide plate 140 to the head mounting plate 154 by the bolts 196 and springs 198, permitting the slight amount of sliding movement, if any, required between the slide plate 140 and head mounting plate 154 to achieve perfect centering. Also, as in the previous embodiment, the resilient support for the head mounting plate holds the same in place on its supports 188, 194. After the head mounting plate reaches its supports, the yoke 142 continues to rotate until its lower surface portion 200 abuts the stop surface 202**.

In the arrangement of FIGURES 7–9, if power should be lost, the springs 158 and 148 cause the head 156 first to tilt upward and then to move to its fully retracted position in view of the relative forces exerted by the springs. In this fully retracted position, there is little possibility that accidental damage can occur to the head.

While not visible in FIGURE 7, this embodiment of the invention includes the means 104a and 104b of FIGURE 4 for rotating the entire head assembly through a small angle about pivot pin 108. This pivot pin is shown in FIGURE 7, as is one of the two bolts 109. The pivot pin passes through an aperture in plate 160 and is secured to plate 147. The bolts 109 pass through slots in plate 160 and are secured to plate 147.

In addition to the features above, the arrangement of FIGURES 7–9 includes two solenoid-actuated piston stopping elements 204 and 206. The solenoid for actuating element 204 is shown in part at 208 and the solenoid for actuating element 206 is shown at 210. Element 204, when actuated, prevents crossbar 176 of the piston 172 from being withdrawn into the cylinder 170 beyond point *x*. This corresponds to a spacing between the head 156 and the tape 212 a relatively small distance—sufficient to permit high speed rewind. As in the previous embodiment, while the head does not touch the tape, it is sufficiently close to permit the end-of-tape signal to be read. When the element 204 is retracted and the element 206 is actuated, the piston cannot be withdrawn into its cylinder beyond the point *y*. With the piston in this position, the magnetic head is spaced a sufficient distance from the tape 212 to permit the head to be cleaned.

What is claimed is:

1. In a mechanical movement,
a base plate;
a pin extending substantially transversely through the plane of said base plate;
a pair of spaced elements, each formed with a notch, located on the base plate, the two spaced elements and pin together defining a triangle;
a movable second plate having a surface facing and adapted to abut the end of said pin;
a bar fixed to the second plate and facing said notches, said bar being matable at its end portions with the notches in the spaced elements;
a third plate above and facing said second plate;
spring means resiliently coupling the third plate to the second plate for permitting a limited amount of seating movement of the second plate relative to said third plate; and
means for moving the third plate to a position such that said bar fixed to said second plate mates with said notches and said surface of said second plate abuts said pin, and for applying sufficient force to said third plate that said bar on said second plate accurately seats in said notches and said second plate is thereafter held in place.

2. In combination:
a supporting member formed with two notches and having a pin one end of which extends above the surface of the member, the two notches and the end of said pin together defining a triangle;
a movable element having a surface facing and adapted to abut the pin, and extending elements fixed thereto which face and are adapted to mate with the notches;
a plate located with said movable element between it and said supporting member;
spring means resliently coupling said plate to said movable element for permitting a limited amount of seating movement of said movable element relative to said plate; and
driving means coupled to the plate for effecting the movement of said plate and said movable element to positions such that said extending elements seat in and are resiliently held in said notches and said surface of said movable element abuts and is resiliently held against said pin.

3. In an arrangement for moving a magnetic head from a retracted position to a position in operative relationship with a magnetic tape, in combination,
a head mounting plate on which the head is rigidly mounted and having a surface adapted to abut a pin;
two projecting elements fixed to the head mounting plate which face and are adapted to mate with spaced notches;
a second plate, facing said head mounting plate on which the head mounting plate is resilient mounted so that a limited amount of seating movement of the head mounting plate relative to the second plate is possible;
a third plate which is fixed in position facing said head mounting plate and which is formed with notches for receiving said projecting elements;
a pin which is fixed to the third plate and having one end which extends in offset relation to the plane of the third plate, said end of said pin and the notches together defining a triangle; and
means for moving the second plate to a position such that it resiliently drives said two projecting elements on said head mounting plate into said notches and said surface of said head mounting plate against said pin, whereby the bar self-adjusts itself, and seats and is resiliently held in said notches, and said surface of said head mounting plate is held against said pin.

4. In combination:
surface formed with three supports, one comprising a pin having one end which extends in offset relation to the plane of said surface and the others comprising a pair of in-line, spaced notches, said end of said pin and the notches together defining a triangle;
a first plate having a bar which is fixed thereto and which faces and is adapted to mate with the two notches, and having a surface which faces and abuts the pin when the bar is properly seated in the notches;
an axle which is in fixed position relative to said surface;
a yoke which is rotatable about said axle and which is formed with track means;
a second plate mounted in and slidable along the track means of said yoke and facing, and resiliently coupled to said first plate with sufficient play to permit a limited degree of relative seating movement between the two plates; and
drive means, including means for moving the second plate along said track and means for rotating the yoke about said axle, for causing said bar on said fixed plate to be resiliently driven into and to be held in said notches and for causing said first plate to abut and to be held on said pin.

5. In an arrangement for moving a magnetic head from a retracted position to a position in operative relationship with a magnetic tape, in combination,
a head mounting plate on which the head is rigidly mounted;
two projecting elements fixed to the head mounting plate which are adapted to mate with spaced notches;
an axle;
a yoke which is rotatable about said axle;
a second plate facing the head mounting plate to which the head mounting plate is resiliently mounted for permitting a limited amount of seating movement of the head mounting plate relative to the second plate and which is slidably coupled to said yoke;
a third plate which is fixed in position and which is formed with notches facing said mounting plate, for receiving said projecting elements, said axle being fixed in position relative to said third plate;
a pin which is fixed to the third plate and which extends in offset relation to the plane of the third plate and faces said head mounting plate, the end of said pin and the two notches together defining a triangle; and drive means, including means for sliding the second plate along the yoke and means for rotating the yoke about said axle, for causing said bar on said head mounting plate to be resiliently driven into and to be held in said notches and for causing said surface of said mounting plate to abut and to be held on said pin.

6. In a mechanical movement, a stationary base plate;

an axle in fixed position relative to said base plate;

a yoke rotatably mounted on said axle and formed with tracks, said yoke being rotatable toward and away from said base plate;

a slide plate slidably mounted in said tracks and normally in a retracted position with respect to said yoke;

a mounting plate resiliently mounted to said slide plate in a position such that said mounting plate is between said slide plate and said base plate; and drive means for sliding the slide plate along said tracks to an extended position and for rotating the yoke about its axle to a position such that the mounting plate resiliently engages and is held against said stationary base plate.

7. In a mechanical movement, an axle;

a yoke rotatably mounted on said axle, and formed with tracks;

a slide plate mounted on said tracks;

spring means under tension coupled at one end of the slide plate and at its other end to the yoke for normally maintaining the slide plate in a retracted position on said yoke; and drive means of the type which, when power is applied, is driven in one direction and, when power is cut off, can be moved in the opposite direction, said drive means for sliding the slide plate along said tracks against the tension of said spring means to an extended position along said yoke, and for rotating the yoke about said axle, whereby if power is removed from the drive means, said spring means tends to return the slide plate to its retracted position.

8. In a mechanical movement, an axle;

a yoke rotatably mounted on said axle and formed with tracks;

a slide plate mounted on said tracks;

biasing means coupled between the slide plate and yoke for normally maintaining the slide plate in a retracted position on said yoke; and drive means of the type which, when power is applied, is driven in one direction and, when power is cut off, can be moved in the opposite direction, said drive means for overcoming the bias imparted by said biasing means and sliding the slide plate along said tracks to an extended position along said yoke, and for rotating the yoke about its axle, whereby if power is removed from the drive means, said biasing means tends to return the slide plate to its retracted position.

9. In a mechanical movement, a supporting chassis;

an axle mounted in said chassis;

a yoke rotatably mounted on said axle, and formed with tracks;

a slide plate mounted on said tracks;

first biasing means coupled between the chassis and yoke for normally maintaining said yoke in a home position;

second biasing means coupled between the yoke and slide plate for normally maintaining the slide plate in a retracted position on said yoke; and drive means of the type which, when power is applied, is driven in one direction and, when power is cut off, can be moved in the opposite direction, said drive means being coupled to said yoke and slide plate for driving the slide plate along said tracks, in a direction opposite to the bias direction, to an extended position, and for rotating the yoke about its axle in a direction opposite to the bias direction, whereby if power is removed from the drive means, said second biasing means tends to return the slide plate to its retracted position and said first biasing means tends to return the yoke to its home position.

10. In a mechanical movement, a supporting chassis;

an axle mounted in said chassis;

a yoke rotatably mounted on said axle, and formed with tracks;

first biasing means coupled between the chassis and yoke for normally maintaining said yoke in a home position;

a slidable element mounted on said tracks;

a stop on said yoke for limiting movement of said slidable element;

second biasing means coupled between said yoke and said slidable element for normally maintaining said element in a retracted position on said yoke;

first pulley means mounted on said yoke;

second pulley means mounted on said chassis; and a cable coupled to said slidable element and passing over said first and second pulley means for driving the slidable element along said tracks in a direction opposite to the bias direction until said slidable element reaches said stop, and for rotating the yoke, also in a direction opposite to the bias direction.

11. In a mechanical movement, a supporting chassis;

an axle mounted in said chassis;

a yoke rotatably mounted on said axle and formed with tracks;

first biasing means coupled between the chassis and yoke for normally maintaining said yoke in a home position;

a slidable element mounted on said tracks;

a second biasing means coupled between said yoke and said slidable element for normally maintaining said element in a retracted position on said yoke; and means for driving the slidable element along said tracks in a direction opposite to the bias direction and for rotating the yoke, also in a direction opposite to the bias direction, both in response to the movement, in a given direction, of the means for driving.

12. In a mechanical movement, a support;

an axle mounted to said support;

a yoke rotatably mounted on said axle and formed with tracks;

a slide plate slidably mounted in said tracks and normally in a retracted position in said yoke;

drive means both for sliding the slide plate along said tracks to an extended position with respect to said yoke and for rotating the yoke about its axle;

means defining a pivot at a pivot point; and means for rotating the support through a small angle about said pivot point and in the plane of said support.

13. In a mechanical movement, a stationary base plate;

an axle which is secured to supports on said base plate;

a yoke rotatably mounted on said axle and formed with tracks, said yoke being rotatable toward and away from said base plate;

a slide plate slidably mounted in said tracks and normally in a retracted position with respect to said yoke;

a mounting plate resiliently mounted to said slide plate to permit a limited amount of seating movement of said mounting plate relative to said slide plate and in a position such that said mounting plate is located between said slide plate and said base plate;

drive means for sliding the slide plate along said tracks to an extended position and for rotating the yoke about its axle to a position such that the mounting plate engages and is resiliently held against the base plate;

a pivot coupled to the base plate; and means for rotating the base plate through a relatively small angle about said pivot and in the plane of said base plate.

14. In an arrangement for moving a magnetic head from a retracted position to a position in operative relationship with a magnetic tape, in combination, a head mounting plate on which the head is rigidly mounted;

two projecting elements fixed to the head mounting plate which face and are adapted to mate with spaced notches;

a second plate to which the head mounting plate is resiliently mounted for permitting a limited amount of seating movement of the head mounting plate relative to the second plate;

a third plate which is fixed in position facing the head mounting plate and which is formed with natches for receiving said projecting elements, said second plate being movably mounted with respect to said third plate;

a pin which is fixed to the third plate and has one end which extends in offset relation to the plane of the third plate, said end of said pin and said two notches together defining a triangle;

means for moving the second plate to a position such that it resiliently drives the bar on said head mounting plate into said notches and the surface of said head mounting plate against said pin, whereby the bar self-adjusts itself and seats, and is resiliently held in said notches, and said surface of said head mounting plate is resiliently held against said pin; and means for rotating the third plate through a relatively small angle lying in the plane of said third plate.

15. In an arrangement for moving a magnetic head from a retracted position to a position in operative relationship with a magnetic tape, in combination, an axle;

a yoke on which said head is slidably mounted and which is rotatable with said head about said axle;

means coupled to said yoke for sliding said head along said yoke to an extended position and for rotating said yoke with said head in one direction to a position such that the extended head engages the tape;

means coupled to said yoke for rotating the same with said head about said axle in the opposite direction; and means for halting the rotation of the head in said opposite direction at a first predetermined stop position at which the head is spaced a relatively small distance from the tape and at a predetermined second stop position at which the head is spaced a relatively larger distance from the tape.

16. In combination, a surface formed with at least three supports which together define a triangle;

a load;

a movable first element supporting said load and facing said surface, said first element including means fixed thereto engageable with said supports, which is movable to a position on said surface such that its engageable means mate with two of said supports and rest on a third of said supports;

a second element serving as a reference element relative to which the first element and load may be moved, said second element having a fixed relationship to said surface;

a carrier element movably coupled to said second element and on which said first element is resiliently mounted, said resilient mounting permitting a limited amount of seating movement of said first element relative to said carrier element; and means for moving said carrier element relatively to said second element for moving said first element into position on said three supports, the resilient mounting between said carrier element and first element allowing sufficient movement between said carrier element and first element to permit the engageable means on said first element accurately to mate with said two supports and to rest on said third support.

References Cited

UNITED STATES PATENTS 2,603,781 7/1952 Ruskin ------------ 227—128

LEONARD FORMAN, *Primary Examiner.*

JOEL M. FREED, *Assistant Examiner.*